UNITED STATES PATENT OFFICE.

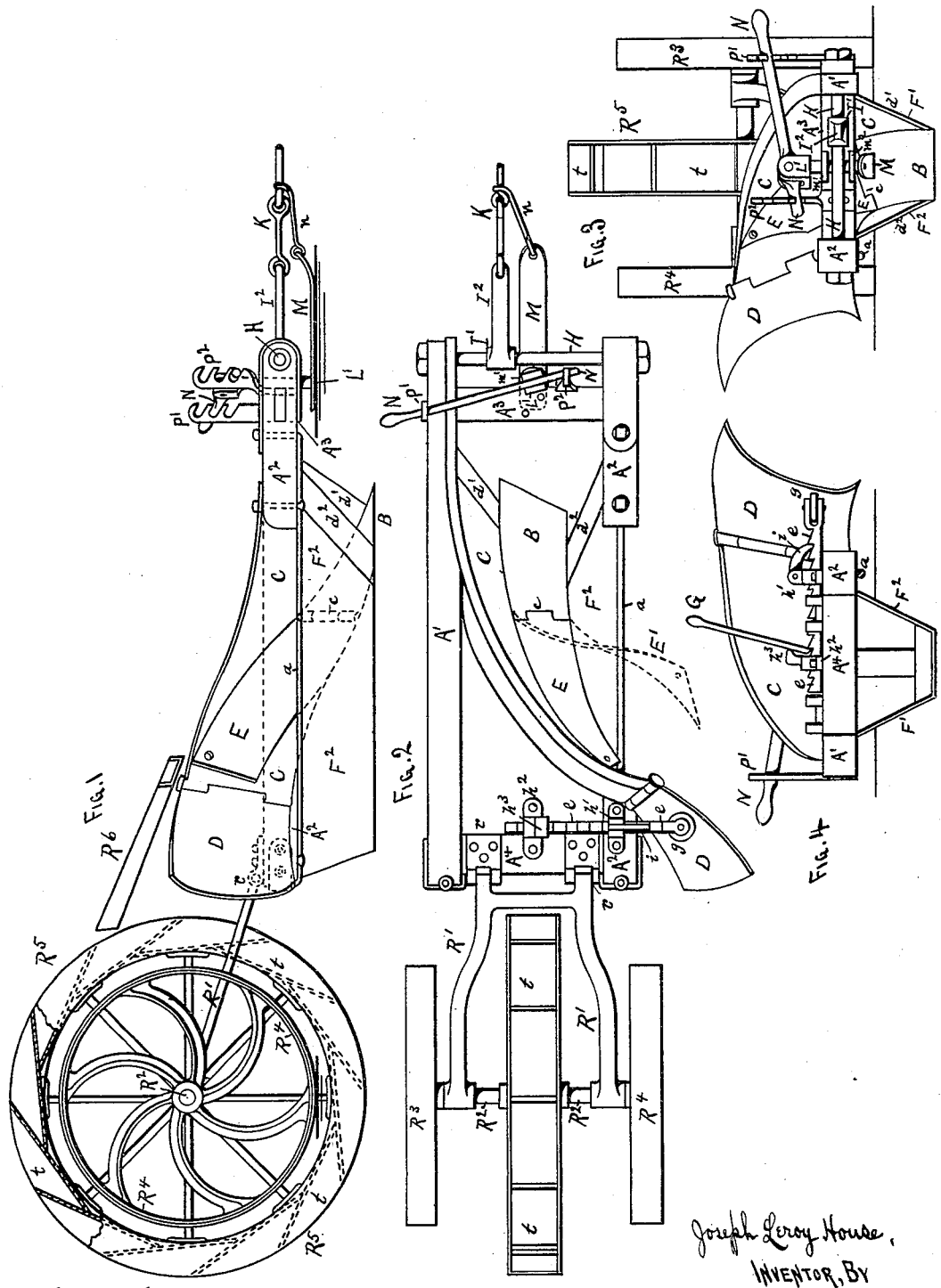

JOSEPH L. HOUSE, OF HUTCHINSON, MINNESOTA.

DITCHING-PLOW.

SPECIFICATION forming part of Letters Patent No. 262,229, dated August 8, 1882.

Application filed March 17, 1882. (No model.)

*To all whom it may concern:*

Be it known that I, JOSEPH LEROY HOUSE, a citizen of the United States, and a resident of Hutchinson, in the county of McLeod and State of Minnesota, have made certain new and useful Improvements in Ditching-Plows, of which the following is a specification.

This invention relates to machines for forming ditches in wet land; and it consists in the construction and arrangement of parts, as hereinafter described and claimed, and as illustrated in the accompanying drawings, in which—

Figure 1 is a side elevation, Fig. 2 is a plan view, and Fig. 3 is a front view, of the ditcher complete, while Fig. 4 is a rear view of the same with the water-elevating wheel removed.

The frame is composed of side pieces, $A'$ $A^2$, and cross-pieces $A^3$ $A^4$ at the ends, the side $A^2$ being cut out at the central part and the gap supplied with a rod, $a$, so that little or no obstruction is offered to the earth in passing over it, as hereinafter shown.

B is the share, having an angular front cutting-edge, and running upward and backward and off to one side, and joined to an inclined rear plate, C, which also curves upward and backward and off to one side, and provided at its rear end with a hinged wing, D, as shown.

E is a curved plate, hinged at $c$ to the share B, and curving upward and backward and off to one side to form a curved mold-board-shaped plate to connect the share and the plate C, these four parts—viz., the share B, curved back C, curved auxiliary plate E, and hinged wing D—forming a plow.

Upon either side, at the front of the share B, are outwardly-inclining cutters $d'$ $d^2$, whose outlines conform to the shape of the ditch to be cut, and from these cutters sheet or boiler iron plates $F'$ $F^2$ run backward, as shown, the length of the frame $A'$ $A^2$ $A^3$ $A^4$.

$e$ is a toothed bar or rack, resting across the frame $A'$ $A^2$ in the rear of the wing D, and provided with a friction-pulley, $g$, in the outer end, adapted to rest against the rear of the wing D.

$h'$ $h^2$ are caps through which the bar $e$ may slide back and forth, the cap $h'$ having a dog, $i$, for catching in the ratchet-teeth to hold the bar outward. The cap $h^2$ has an extended top, $h^3$, to form a fulcrum to a lever, G, whose lower point is adapted to catch upon the ratchet-teeth to force the bar $e$ outward, as shown in Fig. 4. By this arrangement the wing D may be forced outward and held outward at any desired point, and by releasing the dog $i$ the wing may be moved inward and "set" at any desired point, the wing being to regulate the distance which the furrow shall be thrown from the line of the ditch.

Across the front of the frame $A'$ $A^2$ is a shaft, H, passing through the front ends of the sides $A'$ $A^2$, and having a loose-fitting collar, $I'$, mounted thereon. Branching from this collar is a bar, $I^2$, to the end of which the draft chain or cable K is attached.

The collar $I'$ is formed to fit the shaft H rather closely, so that a very slight side draft upon the end of the arm $I^2$ will "cramp" the collar upon the shaft and hold it in whatever position it may be placed in, while at the same time a very light blow upon the collar will move it along the shaft. Hence the "draft" may be readily and quickly changed while the machine is in operation.

$L'$ is an upright standard passing through eyes $m'$ $m^2$ upon the cross-piece $A^3$, and connected loosely at the bottom to a shoe, M, whose forward end is connected by a chain or rod, $n$, to the draft-cable K, so that the shoe will be drawn along on the surface of the ground with the plow and in advance of it.

The upper part of the standard $L'$ is provided with a head, in which a lever, N, is pivoted and held at the ends by toothed standards $P'$ $P^2$, fixed to the frame $A'$ $A^2$. By this means the shoe M may be forced downward or be permitted to rise by setting the lever N downward or upward in the notched standard, and thus regulate the depth of cut of the plow.

To the rear of the plow a frame, $R'$, is hinged at $r$, so that it can be folded back upon the frame $A'$ $A^2$ $A^4$, and supporting a shaft, $R^2$, journaled in its rear end.

$R^3$ $R^4$ are wheels attached to the outer ends of this shaft $R^2$, and adapted to run upon the ground at the sides of the ditch, by which a revolving motion is imparted to the shaft.

To the center of the shaft $R^2$ a large wheel, $R^5$, is attached and provided with buckets $t$ upon its periphery, this wheel being adapted to revolve in the ditch at the rear of the machine, and carry upward and discharge a constant stream of water into a spout, $R^6$, and from thence to the mold-board to lubricate it and prevent the earth from sticking to it when running through clay and similar soils. By hinging the frame R' the water-wheel may be removed when not required.

When the plow becomes clogged, as it frequently will, the auxiliary plate E will be raised upward, as shown at E' in Fig. 2, and the earth thrown off, thereby enabling me to release the plow very readily and easily.

By connecting the end of the draft-chain K with the plate E the power that is used for drawing the plow may be utilized also to release it when clogged.

Any other suitable means for operating the shoe M than that shown may be employed.

I am aware that a gage slide or shoe has been attached to the forward end of the beam or frame of a ditching-plow, and means employed to raise and lower it and to hold it at different adjustments, and therefore I lay no claim thereto, broadly, but only claim my construction.

What I claim as new is—

1. In a ditching-plow, the combination of curved plate C, share B, connected to said plate, mold-board E, hinged to share B, and adjustable wing D, connected to curved plate C, substantially as and for the purpose set forth.

2. The combination of curved plate C, adjustable wing D, hinged thereto, ratchet-bar $e$ for adjusting the wing, and lever G for operating the bar, substantially as set forth.

3. The combination, with ditching-plow, of a frame, R', hinged thereto, a shaft, $R^2$, provided with wheels $R^3$ and journaled in the frame, and a bucket-wheel, $R^5$, connected to shaft $R^2$ and revolved thereby, and having its lower edge below the sides of the ditch, substantially as and for the purpose specified.

4. The combination, with the ditching-plow, of a shoe, M, connected to the forward part of the plow, standard L', connected to shoe M, lever N, pivoted to standard L' for raising and lowering said standard, and notched standards P' $P^2$ for lever N to engage with, the several parts being arranged to operate as set forth.

In testimony whereof I have hereunto set my hand in the presence of two subscribing witnesses.

JOSEPH LEROY HOUSE.

Witnesses:
C. N. WOODWARD,
LOUIS FEESER, Sr.